Figures 13, 14:
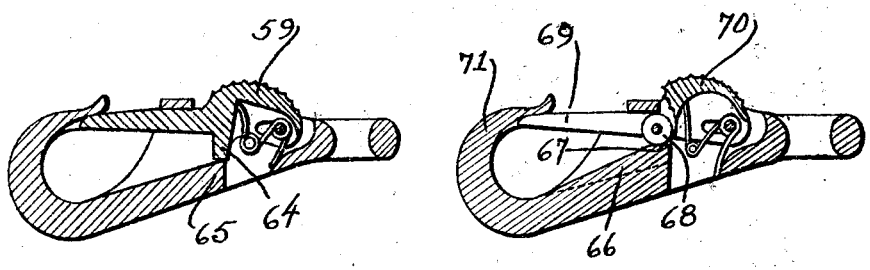

Jan. 6, 1925.
C. W. HARTBAUER
SNAP HOOK
Filed Aug. 6, 1923
1,521,811
3 Sheets-Sheet 1
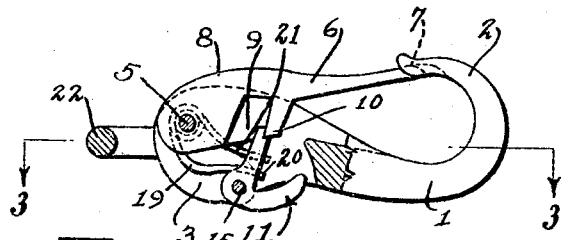
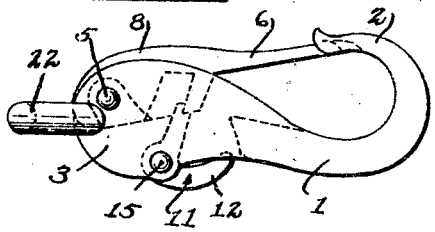 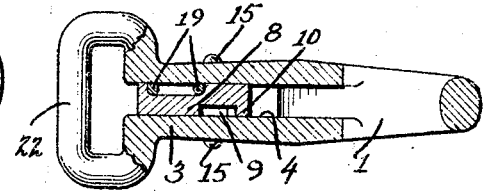
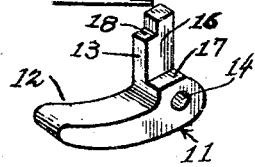 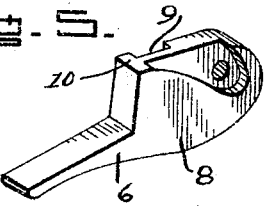
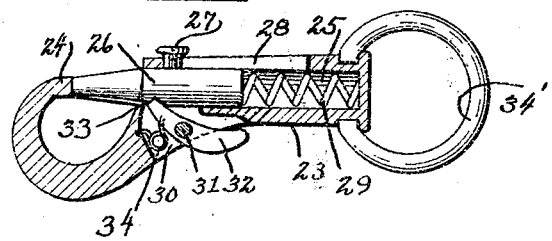
Inventor
C. W. Hartbauer
By Jacobi & Jacobi
Attorneys

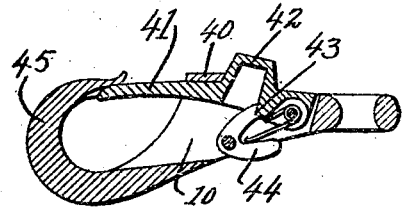
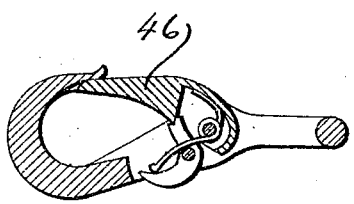
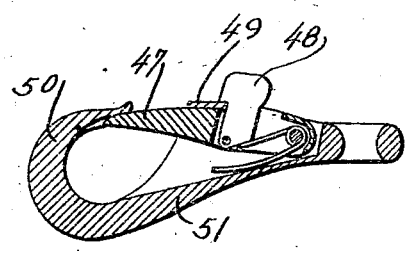
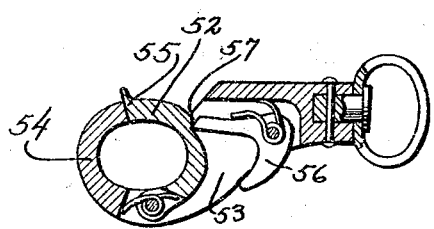
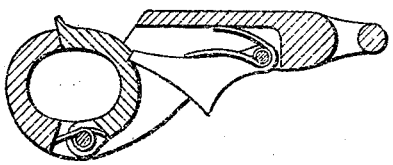
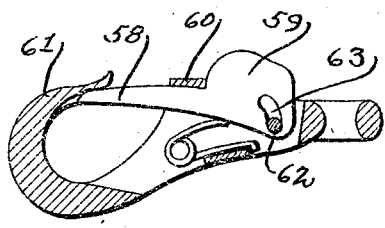

Jan. 6, 1925.  1,521,811
C. W. HARTBAUER
SNAP HOOK
Filed Aug. 6, 1923  3 Sheets-Sheet 3

Inventor
C. W. Hartbauer
By Jacobi & Jacobi
Attorneys

Patented Jan. 6, 1925.

1,521,811

UNITED STATES PATENT OFFICE.

CARL W. HARTBAUER, OF BOUNDARY, WASHINGTON.

SNAP HOOK.

Application filed August 6, 1923. Serial No. 656,000.

*To all whom it may concern:*

Be it known that CARL W. HARTBAUER, a citizen of the United States, residing at Boundary, in the county of Stevens and State of Washington, has invented certain new and useful Improvements in Snap Hooks, of which the following is a specification.

This invention relates to a snap hook and has for its principal object to provide a locking means therefor whereby the snap hook will be prevented from casual displacement when the same is in use.

Another important object of the invention is to provide a snap hook of the above mentioned character which is adapted for use in connection with harness, belts or the like and is of such a construction as to insure a snap hook from disengaging whereby considerable injury may be sustained.

Another important object of the invention is to provide a snap hook of the above mentioned character which is provided with a locking means which may be readily and easily operated and is furthermore positive in its action.

A still further object of the invention is to provide a snap hook of the above mentioned character which is provided with a locking means therefor which is simple in construction, inexpensive, strong and durable and well adapted for the purposes to which it is designated.

Other objects and advantages of this invention will become apparent during the course of the following description.

In the accompanying drawings forming a part of the specification, and in which like numerals designate like parts throughout the same, Figure 1 is a side elevation of my snap hook showing the same partly in section, Figure 2 is a side elevation of the same, Figure 3 is a longitudinal section taken on line 3—3 of Figure 1, Figure 4 is a perspective view of the locking dog or trigger, Figure 5 is a perspective view of the tongue, Figure 6 is a central longitudinal section of a modification of the invention, Figures 7–17 inclusive show further modification of the invention in longitudinal section.

In the drawings wherein for the purpose of illustration is shown the performed embodiment of my invention, the numeral 1 designates the body portion of my snap hook and is provided at its forward end with a curved arm or hooked member 2. The metal at the rear portion of the shank 1 is thickened as indicated by the numeral 3 and is provided with a longitudinally extending cut out portion 4. This cut out portion 4 extends from the bottom edge to the top edge of the thickened portion of the shank 1 for the purpose hereinafter to be more fully described.

Pivotally supported upon the transversely extending pin 5 which extends between the sides of the thickened portion 3 adjacent the rear ends of the hook 1 is the locking tongue 6. This locking tongue 6 forms a space between the shank and the free end of the hook and has its outer free end adapted to fit in a seat 7 formed on the under side of the free end of the hook 2.

The pivoted end of the tongue 6 is enlarged as indicated by the numeral 8 and is provided with a cut out portion 9 in one side face thereof whereby a finger 10 is provided on the enlarged portion 8 of the pivoted locking tongue 6. This finger 10 formed by the cut out portion 9 is adapted to extend into the cut out portion 4 provided in the rear portion of the shank 1 for the purpose hereinafter to be more fully described.

A locking dog comprising a trigger designated by the numeral 11 in the drawings and forms the base portion 12 and is furthermore provided with an angular extension 13 at one end thereof in the manner more clearly shown in Fig. 4 of the drawings. This angular extension 13 is furthermore provided with a transversely extending aperture 14 which provides a means for pivotally supporting the trigger or locking dog 11 on the transversely extending pivot pin 15 mounted in the lower portion of the enlarged thickened portion 3 of the shank 1 so that the angular extension 13 will be pivotally supported within the cut out portion 4 of the shank.

The angular extension 13 is furthermore cut away longitudinally as shown at 15 in the drawings to provide a lateral extension 17 and is also cut away transversely at its upper end to provide a shoulder 18. The purpose of this construction will be hereinafter more fully described. The trigger 11 is furthermore supported upon the pin 15 and the rear portion of the shank 1 in such a manner as to normally have the base portion 12 extending beyond the bottom face of the shank as more clearly shown in Fig. 1 of the drawings.

The transversely extending pin 5 mounted in the rear portion 3 of the shank 1 and upon which is pivotally supported a locking tongue 6 is adapted to support the axial coil spring 19. One of the arms of the axial coil spring 19 is adapted to bend downwardly and engage the extension 17 provided on the trigger 11 preferably on the angular extension 13 thereon while the other free end 21 is adapted to engage the bottom face of the finger 10. It being further understood that the shoulder portion 18 provided on the upper end of the extension 13 on the trigger 11 also is adapted to engage and support a portion of the bottom face of the finger 10.

Normally a coil spring 19 will have its arms 20 and 21 respectively in engagement with the angular extension 13 and the finger 10 of the trigger 11 and the locking tongue 6 respectively so as to cause the shoulder 18 to engage the bottom face 10 of the finger, whereby the locking tongue 6 will be held in a locked position with respect to the hook 2. In this manner the locking tongue 6 will be prevented from accidentally becoming disengaged from the hook portion 2 when in use as this frequently occurs when the snap hook is used and subject to severe strain when not provided with the locking mechanism.

When it is desired to unfasten the snap hook from engagement with the article to which it is secured, the base portion 12 of trigger 11 is adapted to be pressed inwardly and the cut out portion 4 provided in the rear portion of the snap 1 and at the same time the tongue 6 is bushed downwardly so that the shoulder 18 will become disengaged from the bottom face of the finger 10 and whereby the locking tongue 6 may readily be depressed so as to release the free end thereof from engagement with the free end of the hook 2. As soon as the operator releases the trigger 11 and the locking tongue 6, the coil spring 19 will again cause the element to again assume a locked position as heretofore described and will at all times assure the proper locking of the snap hook without the necessity of having to reset the trigger or locking means whenever the snap hook is disengaged or not in use.

At the rear end 3 of the shank 1 of my snap hook is arranged the usual transverse loop 22 for the purpose of permitting a harness strap or belt to which my snap hook is attached to be readily supported thereon.

In Fig. 5 of the drawings I have illustrated a modification of my snap hook wherein the numeral 23 designates the shank portion which is provided with a curved arm or hook 24 at its forward end. The shank 23 is provided with a longitudinal bore 24 in which is adapted for slidable movement the locking tongue 26. This locking tongue 26 is in the form of a tubular rod and is provided with an extension 27 on its upper face which is slidably guided in a longitudinally extending slot 28 provided in the upper portion of the shank 23.

A suitable coil spring shown at 29 in the drawings is seated in the rear portion of the longitudinally extending bore 25 and is adapted to have its free end in engagement with the rear portion of the locking tongue 26 whereby the same is normally held in engagement with the free end of the hook 24 in the manner as more clearly shown in Fig. 5 of the drawings.

The shank portion 23 is furthermore provided with a cut out portion 30 which extends from the bottom face thereof into the longitudinally extending bore 25 and the purpose of this cut out portion 30 is to provide a means for pivotally supporting on the transversely extending pin 31, the locking dog or trigger 32. This locking dog or trigger 32 is pivotally supported on the transverse pin 31 intermediate its ends and has its upper end adapted to extend into the longitudinal bore 25 and furthermore adapted to co-operate with the notch 33 provided in the bottom face of the locking tongue 26 as will hereinafter be more fully described.

Adapted to normally hold the upper portion of the trigger 32 in a locked position in the notch 33 of the locking tongue 26 is the spring 34. This flat spring 34 is disposed in the cutout portion 30 of the shank 23 so as to have one end in engagement with the upper free end of the trigger 32 which extends in the cutout portion 30 of the shank and its opposite end in engagement with the inner face of the cutout portion 30. When it is desired to release the free end of the locking tongue 26 from engagement with the free end of the hook 24, the outwardly extending portion of the trigger 32 is depressed so as to cause the free end thereof to be disengaged from the notch 33 and by grasping the extension 27 and moving the same rearwardly within the slot 28 against the tension of the coil spring 29, the free end of the locking tongue 26 will become disengaged from the object to which it is secured.

A suitable loop or eye 34 is mounted upon the rear end of the shank 23 of the snap hook in the usual manner for attaching the same to a suitable article.

In Figure 7 wherein is shown a further modification the body portion 1 is provided with the crown portion or bridge 40 and pivotally supported in the body 1 is the locking tongue 41. The locking tongue 41 is provided with an upstanding enlarged portion or projection 42 for the purpose of providing a shoulder 43 which is adapted to be engaged by the trigger 44. Upon actuation the trigger 44 is released from the shoulder 43 and by depressing on the projection 42 which is hollow the same will move downwardly over the upstanding portion of the trigger 44 and cause the locking tongue 41 to be disengaged from the hook member 45.

Figure 8 discloses a further modification which is very similar to the construction shown in Figure 1 and the only difference being that the locking tongue 46 in this modification is not provided with the cut out portion of the construction as shown in Figures 1, 3 and 5 of the drawings, otherwise the operation of the locking trigger tongue is identical. In Figure 9 the locking tongue 47 is provided with a pivoted locking dog 48 which is adapted to engage the bridge or crown portion of the body members and upon releasing the locking dog 48 from the crown portion 49 and depressing the same downwardly, the locking tongue 47 will be caused to become disengaged from the hook member 50. It being understood that the central portion of the body 51 is cut out in order to permit the locking tongue 47 and the dog or trigger 48 to move downwardly therein.

In Figures 10 and 11 wherein further modifications are shown, the locking tongue 50 is pivoted in the body portion 53 adjacent the hook portion 54 and these locking fingers or the locking tongue are provided with the upstanding portion 55 adjacent the free end of the tongue for permitting the same to be released from engagement with the free end of the hook 54 when the locking dog 56 is disengaged from the shoulder 57 provided in the outer face of the locking tongue. It being first understood that the locking hook 56 is swung upwardly to disengage itself from the shoulder 57 whereby the locking tongue may be moved rearwardly and away from the hook 54.

In Figure 12 the locking tongue 58 is provided with an enlarged portion 59 which is adapted to engage the crown portion 60 of the body whereby the locking tongue is held in a locked position. In order to unlock the locking tongue from engagement with the hook 61 the enlarged portion 59 is moved rearwardly so that the pin 62 will ride in the elongated slot 63 provided in the enlarged portion of the tongue and cause the enlarged portion 59 to disengage the crown 60 whereby the locking tongue may be depressed into the hollow central portion of the body in order to open the hook. Figure 13 is slightly different from Figure 12 in so far that the enlarged portion 59 is provided with a finger 64 which extends downwardly into the hollowed out portion of the body and is adapted to engage the shoulder 62 whereby the same is held in a locked position and by similar operation the enlarged portion 59 is moved rearwardly to disengage the finger 64 from the shoulder 65 in order to permit the locking finger or tongue 58 to be disengaged from the hook and unlocked.

Figures 15, 16:
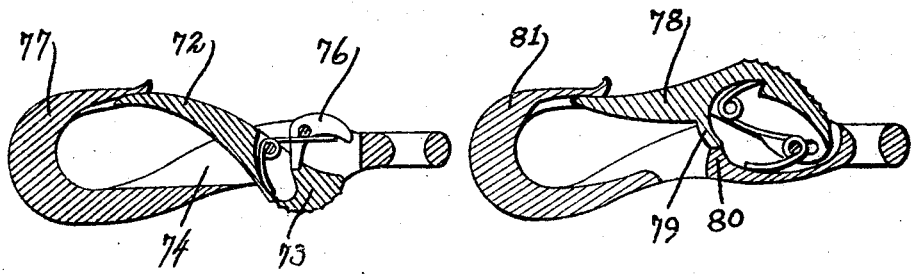

In Figure 14 wherein a still further modification is shown the body portion 66 is provided with a cut-out portion or channel shown as 67 and the purpose of which is to receive the rollers 68 which are carried by the locking tongue 69, the locking tongue 69 being provided with the enlarged portion 70 for causing the rollers to be disengaged from the channel portion whereby the locking finger may be readily moved to an unlocked position, and from engagement with the hook portion 71. The enlarged portion 70 being adapted to move inwardly in a similar manner as the locking finger as shown in Figure 13. With reference to Figure 15 it has the enlarged portion 73 extending through the opposite side of the body portion 74 and the enlarged portion 70 is provided with a shoulder 75 which is adapted to cooperate with the locking trigger 76. In order to release the trigger 76 from engagement with the shoulder 75 whereby the locking finger 72 may be disengaged from the hook 77, the locking trigger is depressed and consequently results in permitting the enlarged portion 73 to be moved upwardly in the cut-out portion of the body so as to cause the free end of the locking tongue 72 to become disengaged from the hook 77.

Figure 17:
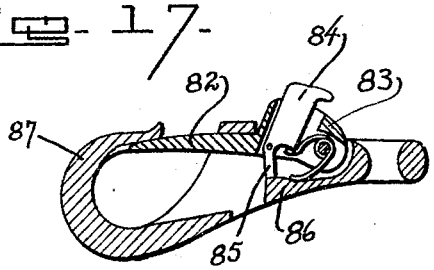

Figure 16 discloses a further modification wherein the locking tongue 78 is adapted to be moved forward so as to cause the downward extending projection 70 to become disengaged from the shoulder 80 provided in the body portion and by depressing the locking tongue 78 downwardly the same will become released from engagement with the hook 81. In Figure 17 the locking finger 82 is provided with the enlarged portion 83 and the latter supports the locking trigger 84. The locking trigger 84 is adapted to have a downwardly extending projection 85 in engagement with a shoulder 86 provided in the body portion and when the same is depressed whereby the projection 85 is released from engagement with the shoulder 86, the enlarged portion 83 may be moved downwardly to cause the locking finger 82 to be disengaged from the hook portion 87. It is to be understood that in all the modifications herein described suitable means is provided for returning the elements to their normal position whereby the locking tongue in each case is held in a locked position with respect to the hook portion of the body.

It will thus be seen from the foregoing description that a snap hook has been provided whereby a locking means is associated therewith for normally holding the snap hook in a locked position and preventing the same from accidentally becoming disengaged while in use, and does not require the use of a key or other independent part in order to release the snap hook from its locked position. Furthermore the simplicity of my snap hook enables the same to be readily and easily unlocked and does not require the loss of a considerable lot of time in locking or unlocking the same whenever it is desired to use it.

From the foregoing description of the construction of my improved apparatus, it will be seen that I have provided a simple, inexpensive and efficient means for carrying out the objects of the invention, and while I have particularly described the elements best adapted to perform the functions set forth, it is obvious that various changes in form, proportion and in the minor details of construction may be resorted to, without departing from the spirit or sacrificing any of the principles of the invention.

I claim:

1. In a snap hook, the combination with a shank having a hook at one end, of a locking tongue slidably mounted in the longitudinal slot provided in said shank, and having its free end adapted for engagement with the free end of said hook, a coil spring mounted in said slot and adapted to normally urge said locking tongue into engagement with the free end of the said hook portion, means for retracting said tongue against the tension of said coil spring, a trigger pivoted intermediate its ends in a cut out portion provided in said shank, and adapted to have its upper end in engagement with a notch provided in said locking tongue, and a coil spring mounted in said cut out portion and disposed between the lower free end of said trigger and the inner end of said locking tongue for normally holding said trigger in engagement with the notched portion of said locking tongue whereby said locking tongue is held in a locked position in engagement with the hooked portion.

2. In a snap hook, the combination with a shank having a hook at one end, the rear portion of said shank being enlarged and provided with a cut out portion, a locking tongue pivotally supported in the cut out portion of said shank and having its free end adapted to engage the free end of said hook, a finger formed on said locking tongue and adapted to extend into said cut out portion of said shank, a trigger pivotally supported in the cut out portion of said shank, said trigger being provided with angular extensions extending upwardly into the cut out portion, said angular extension adapted to engage the bottom of said finger, and means for normally holding said angular extension in engagement with said finger whereby said locking tongue is held in a locked position.

3. In a snap hook, the combination with a shank having a hook at one end, and a locking tongue pivotally supported in the rear portion of said shank, the rear portion of said shank being provided with a cut away portion, a finger formed on the locking tongue and adapted to extend into the said cut out portion, a trigger pivotally supported in the cut out portion of said shank and including an angular extension, said angular extension provided with a shoulder at its upper end for engagement with the bottom portion of said finger, a seat formed on said angular extension, and an axial coil spring carried by the pivotal connection of said locking tongue in said cut out portion, the free end of said axial coil spring adapted to engage the bottom of said finger, and the free portion of said angular extensions respectively whereby said angular extension is held in egagemet with said finger to normally hold the locking tongue in a locked position.

4. In a snap hook, a shank having a hook formed at one end thereof, the opposite end of said shank being centrally slotted, a locking tongue pivotally supported within the slotted end of said shank and adapted for engagement at its free end with the free end of said hook, said tongue being enlarged in width toward its pivoted end and said enlarged portion being cut away from its under edge to provide a depending and spaced finger thereon, a trigger pivoted at its one end within the slotted end of said shank on the side opposite said locking tongue, an angular extension formed on the inner pivoted end of said trigger, the formation of said extension providing a shoulder on the trigger immediately adjacent said extension, a second shoulder formed at the outer free end of said angular extension adapted for engagement with the free end of the finger on said locking tongue, and a wire spring member encircling the pivot of said tongue and having one end thereof extended for engagement with the bottom face of the aforesaid finger and its opposite end extended and resting in contact with the first mentioned shoulder on said trigger, as and for the purposes described.

In testimony whereof I affix my signature.

CARL W. HARTBAUER.